United States Patent [19]

Dickey

[11] 4,225,370
[45] Sep. 30, 1980

[54] CONTRACTED FIBROUS OVERWRAP METHOD FOR THERMOPLASTIC COATED ARTICLE

[75] Inventor: Leland C. Dickey, Omaha, Nebr.

[73] Assignee: InterNorth, Inc., Omaha, Nebr.

[21] Appl. No.: 1,453

[22] Filed: Jan. 8, 1979

[51] Int. Cl.³ ............... B29C 27/00; B31C 81/00; B29C 25/00

[52] U.S. Cl. ............... 156/86; 156/84; 156/188; 264/342 R; 427/370

[58] Field of Search ............ 156/83, 84, 85, 86, 156/149, 187, 188; 264/342 R; 526/67; 427/369, 370

[56] References Cited

U.S. PATENT DOCUMENTS

| | | | |
|---|---|---|---|
| 3,072,517 | 1/1963 | Gaylord | 156/83 |
| 3,190,780 | 6/1965 | McNulty et al. | 156/392 |
| 3,245,856 | 4/1966 | Morain | 156/187 |
| 3,276,929 | 10/1966 | Ferch | 156/83 |
| 3,525,656 | 8/1970 | Kennedy, Jr. | 156/392 |
| 3,736,305 | 5/1973 | Kinkel | 526/67 |

*Primary Examiner*—John T. Goolkasian
*Assistant Examiner*—L. Falasco
*Attorney, Agent, or Firm*—Donald F. Haas

[57] ABSTRACT

A method is disclosed of coating articles of manufacture to prevent corrosion which comprises applying a thermoplastic coating material to the article, applying a layer of fibrous material over the coating material, wetting the layer of fibrous material, and heating the three components, whereby contraction of the fibrous material, during heating, will compress the coating material and counteract its deformation tendencies such that it is well bonded to the article. The thermoplastic coating material is preferably applied in the form of a coating tape comprising the thermoplastic coating material and a thermoplastic adhesive and is used to provide a protective coating for underground pipe.

14 Claims, No Drawings

CONTRACTED FIBROUS OVERWRAP METHOD FOR THERMOPLASTIC COATED ARTICLE

SUMMARY OF THE INVENTION

The present invention relates to a method of coating articles of manufacture comprising the steps of applying a thermoplastic coating to the article, applying a layer of fibrous material over the coating material, wetting the layer of fibrous material, and heating the article, coating material, and wet fibrous material. The fibrous material contracts during the heating and compresses the coating material to counteract its deformation tendencies so that it is well bonded to the article.

The thermoplastic coating material is preferably applied in the form of a coating tape which is comprised of at least one layer of the thermoplastic coating material and at least one layer of a thermoplastic adhesive. The coating materials can be homogeneous polymer films, laminates of polymer films, or combinations of films and fibrous structures and the thermoplastic adhesives can be single homogeneous layers of a polymer or copolymer, mixtures of polymers or copolymers, or structures wherein the adhesive material is present in discrete particles such as globules or fibers. Polyolefins, especially polyethylene, are the preferred coating materials for use in the present invention. Copolymers of olefins and acrylic acids are the preferred adhesives.

The preferred method for applying the layer of fibrous material comprises overwrapping the thermoplastic coating material with a layer of the fibrous material. The fibrous material can be any product with relatively high wet strength which condenses while drying but natural cellulose fibers are preferred.

In one embodiment of the invention, a coating tape comprised of a thermoplastic coating material and a thermoplastic adhesive is wrapped around a pipe to form the protective coating around the pipe. Next, the coating tape is overwrapped with a layer of fibrous material and the fibrous material is wetted. Finally, the pipe, coating tape, and wet fibrous material are heated, whereby the fibrous material contracts and compresses the thermoplastic coating material and adhesive to counteract their deformation tendencies such that the coating tape is well bonded to the pipe.

In another embodiment, the pipe is heated first and then covered with the coating tape and a pre-wet fibrous material layer. The time between application of these layers would necessarily be short to realize the benefits of the invention and minimize the sagging of the tape. Thus, it can be seen that the fibrous material can be wetted either before or after application over the coating material.

BACKGROUND OF THE INVENTION

The present invention relates to a novel method for applying a thermoplastic coating material to an article of manufacture. Most particularly, the invention relates to a method for evenly and firmly bonding thermoplastic coating tape requiring an adhesive to pipes and other conduits.

One disadvantage of thermoplastic materials for use in coating for corrosion protection is that they tend to flow or sag due to gravity when they are hot. Since they are usually hot when applied to an article to be coated, the protective coating layer may be uneven and provide insufficient protection at some points on the surface of the coated article. The use of the wet fibrous material in the present invention eliminates these problems.

Thermoplastic tapes have been used by the pipeline industry as pipe coatings for more than 25 years. Such tapes are made as plastic film only and as film with an adhesive. Historically, these tapes have not required heating during application but with the advent of improved adhesives with high melting points, it became necessary to use heat during the application of many such tapes to pipes.

One of the drawbacks of using these new thermoplastic adhesives to bond thermoplastic coating tapes to metal pipes or other articles of manufacture is that their use usually limits the choice of thermoplastic coating materials to those capable of withstanding the temperatures necessary to develop the adhesive bond. In some cases, it may not even be necessary that the thermoplastic coating material melt or degrade for it to be impossible to apply it uniformly at high temperatures. At temperatures above 200° F., with polyolefin tape especially, there is a reduction in its tensile and/or shear strength which may destroy its intended shape or structure during the coating process or interfere with the close contact between the thermoplastic adhesive and the metal pipe needed for good bonding by causing the tape to sag under the force of gravity.

There are existing coating tapes which do not exhibit this tendency to sag at the temperatures necessary to develop the adhesive bond. These generally utilize a mechanically prestressed cross-linked polyolefin backing which contracts when it is heated. The contraction counteracts the force of gravity as the tape is heated and compresses it onto the pipe. One disadvantage of this method is that prestressed cross-linked polyolefin coating tapes are relatively costly. Tape applied to a rotating pipe, as for example in the case of a mill application, will not sag but instead the tape will be nonuniformly affixed to the pipe. The nonuniformity can be ameliorated by precise control of wrapping tension and temperature but such procedures are very costly and limited to high capital investment and operating cost facilities.

The wet fibrous material performs the same function as the cross-linked polyolefin backing material discussed above, i.e., as it dries under the application of heat as discussed in more detail below, it contracts and compresses the tape or other coating material onto the pipe or other article of manufacture and counteracts the force of gravity. Thus, thermoplastics which tend to sag at the temperatures necessary to develop the adhesive bond may be used since the contraction of the fibrous material prevents sagging.

U.S. Pat. No. 3,190,780 by McNulty, et al., issued June 22, 1965, describes a method of applying a protective wrapping to pipe whereby an enamel is put on the pipe and then a thermoplastic film is put on the pipe over the enamel. An outer layer, which may be comprised of heavy kraft paper, is wrapped around the polyethylene film to prevent it from going "slack". U.S. Pat. No. 3,525,656 by Kennedy, issued Aug. 25, 1970, describes a method of simultaneously applying plastic film and a flexible carrier board to a pipe. The flexible board can be made of "industrial paper" and its purpose is to keep the plastic film from parting when it softens and it also protects the pipe and coating underneath. U.S. Pat. No. 3,245,856 by Morain, issued Apr. 12, 1966, describes a method of applying a coating to a pipe and immediately thereafter covering with a wrapping material which can be heavy felt or kraft paper. None of the above patents disclose the use of a wet fibrous material and the "paper" disclosed is of a heavy grade which is unsuitable for use in the present invention.

It is an object of the present invention to provide a method whereby thermoplastic coating materials and coating tapes can be firmly and evenly bonded to pipes and other articles of manufacture.

It is a further object of this invention to provide a coating method which overcomes the tendency of thermoplastic coating materials and coating tapes to deform under the application of heat.

It is still another object of the present invention to provide a method by which the overlapped areas of a spiral-wrapped thermoplastic coating tape can be compressed to provide an even coating surface.

DETAILED DESCRIPTION OF THE INVENTION

This invention relates to an improved process of protecting articles of manufacture, including structural members such as pipelines, conduits, storage tanks, posts, etc., which are exposed to a corrosive or erosive environment. The invention provides an improved process for coating such articles of manufacture with a thermoplastic coating material which forms a protective barrier around the article to help prevent its degredation from contact with the environment.

The preferred embodiment of the present invention is as an improvement of the process of providing protective coatings for undergound pipelines which may be subjected to corrosion. However, the method of this invention is equally applicable to providing protective coatings for a variety of other materials.

Any thermoplastic material which can be formed so as to approximate the final coating shape during application of the material and thereafter brought into continuous contact with heat and a modicum of pressure may be used in connection with the present invention. Low density polyethylene, high density polyethylene, polypropylene, polybutylene, other polyolefins, modified polyolefins, polyvinylchloride, polyamides, elastomeric materials, and mixtures of these are examples of thermoplastics which are suitable for use herein. These may be applied by any of the conventional application techniques, such as powder or latex spraying, covering with a preformed solid shape such as a sleeve, and forming them into a tape which is overwrapped around the article to be protected.

The preferred technique for applying the thermoplastic coating to the article of manufacture in the present invention is the tape coating technique. A thermoplastic, such as polyethylene, is formed into a coating tape by extruding or calendering together a laminate composed of a backing layer and an adhesive layer. The backing material is selected on the basis of its barrier and strength properties, stability, and cost.

Adhesives which are suitable for use in the present invention are those which must be heated to develop bond strength such as coal tar adhesives, butyl rubber bitumen adhesives, polyolefin copolymers, ethylene vinyl acetate copolymers, ethylene acrylic acid copolymers, ethylene alkyl acrylate systems, and mixtures thereof either as blends or structures composed of discrete components. The preferred adhesive for use in the present invention is a copolymer of ethylene, acrylic acid, and tertiary-butyl acrylate, as described in U.S. Pat. No. 3,736,305 issued May 29, 1973.

These adhesives give the tape coating greater impact strength because the adhesive itself is hard at final use temperatures. Even at high temperatures, the impact strength is improved relative to "soft" adhesives since a thick adhesive layer is not necessary to insure continuous adhesive contact between the backing and substrate being coated. Usually, the outer component layer, or backing, of conventional pipeline tapes is harder than conventional "soft" adhesive layers. The coating is thus more susceptible to puncture or ripping than a securely bound hard adhesive coating. This "hard" adhesive is especially attractive for pipelines, such as the Alaskan Oil Pipeline, where temperatures at which conventional rubber-based adhesives become fluid will be utilized.

In accordance with the present invention, the thermoplastic coating material is applied to the article to be protected. In the case of coating tape, the tape is wound snugly around the article with the adhesive on the inside and with a slight overlap of each succeeding wrap over the previous one. In order to complete the adhesive bond, the coating tape and article must be heated to a temperature in excess of 300° F. At such temperatures, the thermoplastic coating material tends to sag at the bottom of the article due to the force of gravity, especially if the thermoplastic coating material has a low softening or melting point as do most polyolefins. Even if other coating materials than the tape method are used, the hot thermoplastic coating material tends to sag or flow at the bottom of the article to be coated. This causes the thickness of the protective coating to be uneven and decreases the efficiency and the useful life of the coating.

In order to prevent the thermoplastic coating material from sagging, a layer of a fibrous material is applied to the article over the coating material. As the purpose of the wet overwrap is to compress the coating during its heating period, it should be wrapped over the coating in its wet (expanded) form. It is also possible to apply the fibers dry, wet them on the coated object, and compress the wet overwrap into a snug fit over the coating. The fibrous material may be included as part of the coating tape rather than being applied separately. Thus, the tape would have an inner layer of thermoplastic adhesive, a middle layer of thermoplastic coating material, and a loosely joined outer layer of the fibrous material all in one integral coating tape. In this case, a single wrapping will produce a structure suitable for wetting and heating to affect the object of the invention, a tight well-adhered coating.

Next, the article, the coating material, and the wet fibrous material are heated by any suitable means such that the fibrous layer does not dry before the coating material begins to adhere to the article, including an induction coil surrounding the pipe or by blowing combustion exhaust gases through the pipe. As the fibrous material is heated, it dries and the surface tension of the withdrawing water film on the fibers contracts it onto the article, thereby counteracting the deformation tendencies of the coating material and uniformly holding it in place. This insures a relatively even thickness of the coating material around the surface of the article. Also, the contracting force of the fibrous material is usually sufficient to compress the overlapped areas of a spiral-wrapped coating tape so that the surface of the coating is relatively smooth and uniform.

As stated above, the fibrous material may be any product with relatively high wet strength which condenses while drying. More particularly, it may be paper of strength comparable to disposable household hand towels or may consist of non-woven materials made of hydrophilic synthetic or natural fibers of rayon, polyester, nylon, wool, cotton, jute, and others. The preferred fibrous material for use in this invention is non-woven paper reinforced with polymer particles from an emulsion, such as acrylic polymer latex. This paper has good tensile strength because it is comprised of long cellulose or synthetic fibers and has been treated to increase its elasticity by a roll compaction process such as the Clupak process or by embossing to create a bulky structure. Crimped fibers may also be used to improve the strength of the fibrous layer.

The most common method of applying the fibrous layer over the coating material is to simply spiral-wrap the fibrous material around the article. The fibrous material is supplied in roll form similar to the rolls of common disposal hand towels, either wet or dry. However, the fibrous layer can also be applied by various methods such as a fibrous air suspension, a fibrous water slurry, or a fibrous foam which can then be condensed by appropriate means to the desired density and morphology.

The preferred wetting agent for use in this invention is water, but various aqueous solutions of surfactants may also be used. The wetting compound may be applied by any reasonable method, including soaking before wrapping, or spraying during or after wrapping.

Tape coatings formed as described above, but without the wet fibrous material outer wrapping, will invariably sag at the bottom of a stationary pipe or other articles to be coated and may exhibit blistering where the tape is overheated due to local temperature nonuniformities. These effects are more pronounced on large objects where the coating weight is greater and a greater likelihood of temperature excess exists. The sagging could be so bad that a continuous sheet of polymer around the pipe is not formed. When unrestrained, these polymers may expand somewhat on heating and the originally snug spiral wrap will come loose, adding to the sagging effect and preventing contact between the adhesive layer and the surface of the article at the bottom of the article. The process being claimed also produces a greater thermal gradient through the coating thickness while the wet outer wrap is drying. This gradient allows the adhesive to reach a temperature where it has relatively low viscosity and good surface wetting properties thus forming a strong bond to the pipe surface, while the coating exterior is relatively cool. By adjusting the weight of water applied with the fibrous layer, the coating heat-up rate can be controlled to minimize any tendency for separation between coating layers due to differential expansion characteristics.

The coating material can also be applied to a heated article, such as a pipe. Attempts to apply a thermoplastic coating material in certain thin tapes or other forms to a heated pipe without the fibrous overwrap of this invention will be unsuccessful because the heat required to develop a good adhesive bond to the pipe will make the thermoplastic coating material too weak to control by tension during the application process. The use of the fibrous material allows the thermoplastic coating material to be applied directly to the hot article. The fibrous material holds the thermoplastic coating material in place until it hardens.

EXAMPLE 1

A 20-foot joint of 6" diameter steel pipe was snugly spiral-wrapped with a 6" wide×27 mil thick plastic tape. The tape consisted of a 25 mil layer of low density polyethylene and a 2 mil layer of polyethylene copolymer adhesive (containing 4% acrylic acid, 7% tertiary butyl acrylate, with a melt index of 7) formed by coextrusion. A layer of wet paper towel, of a type supplied in rolls for hand drying, was then spiral-wrapped over the tape.

The pipe was then heated by moving an induction coil along the pipe at a rate of 1 foot per minute. The coil consisted of ten 10" diameter turns of No. 3 copper wire. Approximately 70 amps of 400 Hz, 100 volt current was passed through the coil. This heating method provided sufficient energy to the pipe to heat a bare pipe from ambient temperature to a pipe surface temperature of about 350° F. The shrinkage of the paper and tape combination was clearly evident and the coating produced conformed to the pipe so well that a ⅛" longitudinal weld seam was sharply outlined through the coating. When selections of the coating were cut away to examine the conformity of the pipe-coating contact at the tape edge overlap no seam was evident. This is solid proof that the tape was rendered sufficiently plastic by the heating procedure to flow onto the pipe surface. At the same time the tape was maintained in a uniform overall configuration by the contracting paper outer layer.

EXAMPLE 2

A 20-foot joint of 6" steel pipe was spiral-wrapped as in Example 1, except that no wet paper towel was applied before heating. In this case, bulges in the coating appeared at random locations at sites of higher pipe temperature. These bulges were of varying size up to 2" in diameter and as much as ½" from the pipe surface. As the coating and pipe cooled the bulges subsided onto the pipe but remained separated from the pipe surface. Such bulges are points of extreme vulnerability of the coating to impact, puncture, or tearing forces.

EXAMPLE 3

A 3-foot section of a 36" diameter pipe was spiral-wrapped with tape as in Example 2 and heated. In this case, the tape sag was very pronounced, being about 4" to 5" on the bottom of the pipe. Upon cooling the sag was reduced somewhat. However, it is evident that some plastic deformation of the tape had occurred so that the lowest third of the pipe surface did not have contact with the tape, although it was originally snugly wrapped.

I claim:

1. A method of coating an article of manufacture, comprising the steps of:
   (a) applying a thermoplastic coating material to the article to form a distinct layer thereon;
   (b) applying a layer of fibrous material over the coating material, said fibrous material being a fibrous product with relatively high wet strength which condenses while drying;
   (c) wetting the layer of fibrous material with a wetting agent selected from the group consisting of water and aqueous solution; and
   (d) heating the article, coating material, and wet fibrous material, whereby contraction of the fibrous material, during heating, will compress the coating material and counteract the deformation tendencies of the coating material such that it is well bonded to said article.

2. The method of claim 1 and further characterized in that step (a) comprises wrapping the article with a coating tape comprised of a thermoplastic coating material and a thermoplastic adhesive.

3. The method of claim 2 and further characterized in that the thermoplastic coating material is a polyolefin and the thermoplastic adhesive is a copolymer of an olefin and acrylic acid.

4. The method of claim 1 and further characterized in that step (b) comprises overwrapping the thermoplastic coating material with a layer of the fibrous material.

5. The method of claim 4 and further characterized in that the fibrous material is a natural cellulose fiber.

6. The method of coating a pipe or other conduit, comprising the steps of:
   (a) applying a thermoplastic coating material to the pipe to form a distinct layer thereon;
   (b) applying a fibrous material over the coating material, said fibrous material being a fibrous product with relatively high wet strength which condenses while drying;
   (c) wetting the layer of fibrous material with a wetting agent selected from the group consisting of water and aqueous solutions; and
   (d) heating the pipe, coating material, and wet fibrous material, whereby contraction of the fibrous material, during heating, will compress the coating material and counteract the deformation tendencies of the coating material such that it is well bonded to said pipe.

7. The method of claim 6 and further characterized in that step (a) comprises wrapping the pipe with a coating tape comprised of a thermoplastic coating material and a thermoplastic adhesive.

8. The method of claim 7 and further characterized in that the thermoplastic coating material is a polyolefin and the thermoplastic adhesive is a copolymer of an olefin and an acrylic acid.

9. The method of claim 6 and further characterized in that step (b) comprises overwrapping the thermoplastic coating material with a layer of the fibrous material.

10. The method of claim 9 and further characterized in that the fibrous material is a natural cellulose fiber.

11. The method of coating a pipe or other conduit, comprising the steps of:
    (a) wrapping the pipe with a coating tape comprised of a thermoplastic coating material and a thermoplastic adhesive;
    (b) overwrapping the coating tape with a layer of fibrous material which is a fibrous product with relatively high wet strength which condenses while drying;
    (c) wetting the layer of fibrous material with a wetting agent selected from the group consisting of water and aqueous solutions; and
    (d) heating the pipe, the coating tape, and the wet fibrous material, whereby the contraction of the fibrous material, during heating will compress the thermoplastic coating material and adhesive and counteract the deformation tendencies of the thermoplastic coating material and adhesive such that the coating tape is well bonded to said pipe.

12. The method of claim 11 and further characterized in that the thermoplastic coating material is a polyolefin, the thermoplastic adhesive is a copolymer of an olefin and an acrylic acid, and the fibrous material is a natural cellulose fiber.

13. The method of coating a pipe or other conduit, comprising the steps of:
    (a) wrapping the pipe with a coating tape comprised of a thermoplastic coating material, a thermoplastic adhesive, and an outer layer of a fibrous material which is a fibrous product with relatively high wet strength which condenses while drying;
    (b) wetting the layer of fibrous material with a wetting agent selected from the group consisting of water and aqueous solutions; and
    (c) heating the pipe and the coating tape, whereby the contraction of the fibrous material, during heating, will compress the thermoplastic coating material and adhesive and counteract the deformation tendencies of the thermoplastic coating material and adhesive such that the coating tape is well bonded to said pipe.

14. The method of claim 13 and further characterized in that the thermoplastic coating material is a polyolefin, the thermoplastic adhesive is a copolymer of an olefin and an acrylic acid, and the fibrous material is a natural cellulose fiber.

* * * * *